(12) United States Patent
Gatlin

(10) Patent No.: US 6,489,272 B2
(45) Date of Patent: *Dec. 3, 2002

(54) LUBRICANT, SOLVENT AND EMULSIFIER COMPOSITION AND METHOD OF MANUFACTURE

(76) Inventor: Larry W. Gatlin, Rte. 2, Box 181A, Hwy. 1301, Floresville, TX (US) 78114

( * ) Notice: Subject to any disclaimer, the term of this patent is extended or adjusted under 35 U.S.C. 154(b) by 0 days.

This patent is subject to a terminal disclaimer.

(21) Appl. No.: 09/773,864

(22) Filed: Feb. 1, 2001

(65) Prior Publication Data

US 2001/0006935 A1 Jul. 5, 2001

Related U.S. Application Data

(63) Continuation of application No. 09/079,023, filed on May 14, 1998, now Pat. No. 6,194,361.

(51) Int. Cl.⁷ ................ C10M 129/00; C10M 133/16
(52) U.S. Cl. ............. 508/452; 508/476; 508/500; 508/501; 508/514; 507/239; 554/63
(58) Field of Search ............... 508/452, 476, 508/500, 501, 514; 507/239; 554/63

(56) References Cited

U.S. PATENT DOCUMENTS

| | | | |
|---|---|---|---|
| 2,500,163 A | 3/1950 | Garwood | 260/683.15 |
| 3,108,068 A | 10/1963 | Weiss et al. | |
| 3,179,615 A | 4/1965 | Magne et al. | 260/30.4 |
| 3,298,954 A | 1/1967 | Brown | |
| 3,361,771 A | 1/1968 | Magne et al. | 260/348 |
| 3,396,105 A | 8/1968 | Burdyn et al. | |
| 3,515,754 A | 6/1970 | Mod et al. | 260/558 |
| 4,263,465 A | 4/1981 | Sheng et al. | 585/18 |
| 4,282,392 A | 8/1981 | Cupples et al. | 585/10 |
| 4,436,636 A | 3/1984 | Carnicom | |
| 4,464,269 A | 8/1984 | Walker | |
| 4,502,963 A | 3/1985 | Harmon | |
| 4,525,285 A | 6/1985 | Son et al. | |
| 4,587,368 A | 5/1986 | Pratt | 585/12 |
| 4,652,385 A | 3/1987 | Cohen | |
| 4,876,017 A | 10/1989 | Trahan et al. | |
| 5,421,907 A | 6/1995 | Nieendick et al. | 134/40 |
| 5,547,925 A | 8/1996 | Duncan, Jr. | 507/103 |
| 5,622,911 A | 4/1997 | Hasebe et al. | 504/116 |

FOREIGN PATENT DOCUMENTS

| | | | |
|---|---|---|---|
| WO | WO 97/12947 | 3/1996 | C09K/7/00 |

OTHER PUBLICATIONS

Product Information (5 pp.) on GP 715D27 of Georgia Pacific, dated Jan. 1997.
Material Safety Data Sheet (3 pp.) of EXPO #68 Methyl Esters of Expo Chemical Company, dated Jul. 31, 1995.
Material Safety Data Sheet (2 pp.) of Lubra–Glide of Sun Drilling Products Corp., dated Jan. 1, 1984.
Sample Analysis (9 pp.) of Ethylflo 162 of Ethyl Corporation, dated Oct. 30, 1990.
Material Safety Data Sheet (2 pp.) of LVT 200 of Conoco, printed Nov. 9, 1992.
Product Information (3 pp.) of ESCAID 110–Low–Toxicity Drilling Mud Oil of Exxon Co., U.S.A., undated—unknown.
Product Information (1 p.) of Crystex AF Oils of Lyondell Lubricants, dated Mar. 1992.
Product Information (1 p.) of Duoprime Oils of Lyondell Industries, dated Jul. 1993.

*Primary Examiner*—Cephia D. Toomer
(74) *Attorney, Agent, or Firm*—Locke Liddell & Sapp LLP; Monty L. Ross

(57) ABSTRACT

A composition useful as a well lubricant, solvent, emulsifier, and performance extender for corrosion inhibitors in high velocity gas, oil or water drilling, production or gathering applications, that is preferably formed by the reaction and distillation of a tall oil fatty acid with a fatty alkanolamide, preferably in the presence of methyl ester of fatty acids, and most preferably when further reacted and distilled with an emulsifier such as coconut oil diethanolamide or distilled tall oil amide of aminoethylpiperazine. The fatty acids and oils useful in the invention can range from $C_8$ to $C_{24}$, with $C_{12}$, $C_{14}$, $C_{16}$, $C_{18}$ and $C_{20}$ fatty acids and oils being most preferred. The presence of methyl ester is preferred because it functions as a foam suppressant, diluent and amine scavenger during distillation.

63 Claims, No Drawings

LUBRICANT, SOLVENT AND EMULSIFIER COMPOSITION AND METHOD OF MANUFACTURE

CROSS REFERENCE TO RELATED APPLICATION

This application is a continuation of U.S. application Ser. No. 09/079,023, filed May 14, 1998, which issued Feb. 27, 2001 as U.S. Pat. No. 6,194,361 B1.

BACKGROUND OF THE INVENTION

1. Field of the Invention

This invention relates to compositions useful as lubricants for spotting fluids in well drilling operations with either oil-based or water-based muds. The compositions of the invention are non-toxic and biodegradable, are especially useful in fast hole drilling, and also function as performance extenders for corrosion inhibitors in high velocity gas, oil or water drilling, production or gathering applications. The invention also relates to a method for making the subject lubricant using a controlled mixing process and distillation under controlled conditions to remove more volatile components and promote esterification and further reaction with amine substituents.

2. Description of Related Art

International Publication Number WO 97/12947, which claims priority based on U.S. Ser. No. 08/538,262, filed Oct. 3, 1995, discloses high flash point, low vapor pressure, cleaning compositions for oil and gas wells, said compositions containing about 40 to 99 weight percent of a fatty acid alkyl ester blend and about 1 to 25 weight percent of at least one lower alkyl glycol ether. The disclosed compositions, when injected into wells, are said to produce a coating on well casings, lines, pumps, pipes and other equipment, to prevent the adhesion and accumulation of paraffins, other related soils, and scale on these parts to help retard corrosion, and to allow more efficient operation and consistent production between cleanings. Preferred fatty acid alkyl ester blends for use in the invention are selected from the group consisting of $C_1$ to $C_8$ esters of $C_4$ to $C_{22}$ fatty acids. Preferred lower alkyl glycol ethers are selected from the group consisting of ethylene glycol monobutyl ether, diethylene glycol monobutyl ether, dipropylene glycol monomethyl ether, tripropylene glycol monomethyl either, and mixtures thereof. The optional use of from 1 to 40 weight percent polyoxyalkylene glycol ethers is also disclosed.

Various other prior art drilling fluid additives, spotting fluids and lubricant compositions are disclosed, for example, in U.S. Pat. Nos. 2,500,163; 3,108,068; 3,298,954; 3,396,105; 4,263,465; 4,282,392; 4,436,636; 4,464,269; 4,502,963; 4,525,285; 4,587,368; 4,652,385; 4,876,017; 5,421,907; and 5,547,925.

A well lubricant composition is needed that has a low acid number, and is therefore much less likely to form calcium soaps from lime in downhole formations, which can in turn cause undesirable foaming in drilling muds. The desired composition should also be nontoxic and not susceptible to foaming during manufacture.

SUMMARY OF THE INVENTION

The composition of the invention is a well lubricant, solvent and emulsifier that is preferably formed by the sequential reaction and subsequent distillation of a tall oil fatty acid having a moderately low rosin content with a fatty alkanolamide, preferably in the presence of methyl ester of fatty acids, and most preferably when further reacted with an emulsifier such as coconut oil diethanolamide or an amide of aminoethylpiperazine (AEP) under distillation conditions facilitating the removal of water and lighter reaction byproducts. The fatty acids and oils useful in the invention can range from $C_8$ to $C_{24}$, with $C_{12}$, $C_{14}$, $C_{16}$, $C_{18}$ and $C_{20}$ fatty acids and oils being most preferred. The use of methyl ester is preferred because it functions as a foam supressant, diluent and amine scavenger during distillation.

The composition of the invention has low viscosity compared to tall oil amides and imidazolines, predominantly remains in the oil phase, and is easily dilutable in pale oils, white oils, polyalpha or internal olefins, methyl esters or terpenes, d-limonenes, dipentenes, and the like. In aqueous solution the invention forms a dispersion that, when static or quiescent, evolves completely to oil, not leaving a residual material to sheen or cloud the water. The composition of the invention provides strong adhesion and oil wetting to metal parts, thereby reducing wear, increasing lubricity and improving fast hole drilling.

The compositions of the invention, in their most preferred form, are believed to have the following general molecular structure:

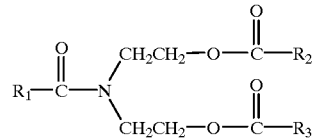

wherein $R_1$ is distilled tall oil or coconut oil; $R_2$ is low rosin tall oil, vegetable oil or distilled tall oil; and $R_3$ is vegetable oil, tall oil or distilled tall oil.

A method is disclosed herein for producing the lubricant composition of the invention by combining and reacting the components within a controlled temperature range over a prolonged period and distilling off water and volatile reaction byproducts. The reaction and distillation can be done under pressures such as 45 to 120 psig using an autoclave or other pressure vessel in combination with a conventional overhead condenser system, or can be done at approximately atmospheric pressure (slight vacuum to 5 psig) using a conventional stirred reactor vessel that is vented to a condenser or to another chilled vessel that functions as a condenser.

According to a preferred method of the invention, the preferred components are combined and mixed inside a stirred reactor vessel in fluid communication with a chilled condenser section. The temperature of the reactants is gradually raised to a temperature above 300° F., most preferably between about 320° and about 350° F., using heating means such as steam coils, and maintained at that temperature, usually for about 6 to 8 hours or more, sometimes up to about 12 hours, until the reaction is substantially complete. Distillation is desirably continued until the pressure of reaction reaches zero to facilitate the removal of distillable liquids, sweet perfume and clear liquids, followed by dark distillates of rearrangement.

The reaction product is periodically sampled and the acid number is determined. Sampling is desirably continued on an hourly basis until the acid number is less than about 35, and most preferably, about 25 or lower. Samples are also desirably checked for AEW, which is preferably greater than 1000, and most preferably, ranges between about 2000 and about 5000 as the acid number drops to about 25.

The preferred amides for use in the invention are most preferably made using diethanolamine (DEA), monoethanolamine (MEA), and other hydroxyethylamines that can undergo low temperature esterification and then interchange during the distillation. The oils can react by inter- or trans-esterification. During the process of the invention, the oils, fatty acids or methyl esters are believed to further react with free amine, the amine portion of fatty ester components, and also, the glycerin produced by decomposition of the oils (triglycerides). The subject process is believed to facilitate molecular rearrangement, lower the acid number, increase the amine equivalent weight (AEW), and remove substantially all soaps, water, methanol and low molecular acids and unreacted esters from the product, together with any other species that will steam distill. Removal of the steam-distillable materials eliminates their subsequent vaporization during use, for example, in hot drilling systems.

DESCRIPTION OF THE PREFERRED EMBODIMENTS

The products of the invention utilize fatty acids, preferably fatty acids contained in tall oil derived from pine trees, containing about two weight percent rosin, and most preferably, distilled tall oil containing from about 10 to 50% rosin acids. Secondly, the products depend on other vegetable oils or extracts, especially those obtained from coconut or coffee, but can also be made using oils or extracts from soya, safflower, canola, rapeseed, flax, cotton and the like. Distilled tall oil, low rosin tall oil and reclaimed cooking oil can also be used as the "vegetable oil" component in making the compositions of the invention. Tall oil fatty acids having from 8 to 24 carbon atoms are preferred, with tall oil fatty acids having $C_{12}$, $C_{14}$, $C_{16}$, $C_{18}$ and $C_{20}$ fatty acids being most preferred.

The mixing and prolonged heating of the reactants within a controlled temperature range and under distillation conditions, as described in greater detail below, is desired to allow molecules to develop as predicted. Although products formed simply by mixing the reactants may exhibit some of the utility of the product of the invention, rearrangement of the reaction products through inter- and trans-esterification during prolonged heating is believed to be necessary for achieving the full utility of the preferred product of the invention.

The compositions of the invention, in their most preferred form, are believed to have the following general molecular structure:

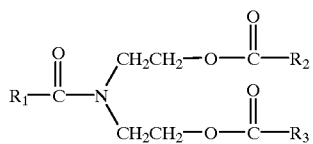

wherein $R_1$ is distilled tall oil or coconut oil; $R_2$ is low rosin tall oil, vegetable oil or distilled tall oil; and $R_3$ is vegetable oil, tall oil or distilled tall oil. These compositions are preferably made by combining under controlled reaction conditions as set forth herein components selected from each of the following four principal groups: methyl esters; tall oil fatty acids; esters produced from amides (amide/esters); and amides.

Methyl esters suitable for use in the compositions of the invention include, for example, methyl esters of $C_{16-18}$ saturated and $C_{18}$ unsaturated fatty acids, and methyl esters of tall oil fatty acids.

Fatty acids suitable for use in the compositions of the invention include, for example, disproportionated tall oil fatty acids; distilled tall oil; disproportionated tall oil; resin acids and rosin acids; and rosin tall oil.

Amide/esters that are suitable for use in the compositions of the invention include, for example, the reaction product of distilled tall oil and an alkanolamine, particularly diethanolamine or monoethanolamine; N, N-bis (hydroxyethyl) tall oil fatty amides; reaction products of rosin with diethanolamine; and reaction products of tall oil fatty acids with diethanolamine.

Amides suitable for use as emulsifiers in the compositions of the invention include the reaction product of vegetable oil and an alkanolamine, the reaction product of vegetable oil with a polyethylene amine, the reaction product of distilled tall oil with AEP, and the reaction product of distilled tall oil with a polyethylene amine, for example, N,N-bis (hydroxyethyl) saturated and unsaturated $C_{8-18}$ and $C_{18}$ amides; reaction products of coconut oil with diethanolamine; and reaction products of these substituents with AEP and other polyethylene amine homologues.

A well lubricant composition of the invention comprises from about 45 to about 90 weight percent of the reaction product of tall oil fatty acid and a fatty alkanolamide, reacted in the presence of up to about 25 weight percent, and more preferably from about 5 to about 25 weight percent, methyl ester of fatty acids, then further reacted and distilled in the presence of from about 5 to about 30 weight percent of the reaction product of a fatty oil with an alkanolamine. The combined weight of the fatty acid and amide/ester components preferably ranges from about 55 to about 90 weight percent of the total reactants, and their ratio of fatty acid to amide/ester desirably ranges from about 2:1 to about 3:2. Where the fatty alkanolamide is the reaction product of distilled tall oil and diethanolamine, the distilled tall oil and diethanolamine are preferably reacted in a ratio of about 3:1 by weight. According to a particularly preferred embodiment of the invention, from about 5 to about 25 weight percent of methyl ester of fatty acids is also added to the initial reactants to scavenge for free amines, suppress foaming, and function as a diluent. The amide component is believed to function as an emulsifier, and is desirably present in an amount ranging from about 5 to about 30 weight percent of the reactants.

A well lubricant composition is disclosed that comprises from about 60 to about 90 weight percent of a first reaction product of distilled tall oil and fatty alkanomide, which is further reacted and distilled in the presence of from about 10 to about 20 weight percent of a second reaction product of distilled tall oil and AEP. The reaction product of distilled tall oil and fatty alkanomide is preferably produced in the presence of from about 5 to about 25 weight percent methyl ester of fatty acids having from about 16 to 18 carbon atoms. One embodiment of the subject well lubricant composition comprises from about 30 to about 60 weight percent distilled tall oil. One embodiment of the subject well lubricant composition comprises from about 30 to about 60 weight percent fatty alkanolamide. In one embodiment of the subject well lubricant composition, the distilled tall oil contains about 25 weight percent rosin. In one embodiment of the subject well lubricant composition, the methyl ester contains about 25 weight percent rosin.

The temperature is preferably further increased until the temperature is above 300° F., and most preferably between about 320° F. and about 350° F., then controlled within that range with continuous distillation until the reaction substantially reaches completion. Completion of the reaction may take from about six to about eight hours, and sometimes up to about 12 hours, from the time that the reactants reach a temperature of at least about 300° F.

It is believed that during the reaction, some of the tall oil fatty acid is converted to methyl ester. It is also believed that the presence of methyl ester in the system reacts with unreacted secondary amines that may be present in the amide components, particularly where the amide is a reaction product of distilled tall oil with AEP.

During distillation, the reaction mixture is vented to a condenser vessel or section, whereby distillable liquids, sweet perfume and clear liquids are removed, followed by dark distillates of rearrangement. Distillation is continued until the pressure of reaction reaches zero. The reaction product is sampled and the acid number is determined. Sampling is desirably continued on an hourly basis until the acid number is less than 35, and most preferably, about 25 or lower. Samples are also desirably checked for AEW, which is preferably greater than 1000, and most preferably, ranges between about 2000 and about 5000 as the acid number drops to about 25. It is observed that a weight loss of from about two to about four percent (when comparing weight of the reaction products remaining in the reactor to the weight of reactants at about 180° F.) is typical of the compositions of the invention when made as disclosed herein, and such weight loss is believed to be further evidence of substantial completion of the reaction and the associated distillation desired to produce the products of the invention.

The products of the invention will desirably have a pH ranging between 6 and 8, with a range of from about 6 to about 7.5 preferred. A pH in excess of about 8.3 may indicate the presence of free amine, which can be toxic.

The method and composition of the invention are further described and explained in relation to the following examples:

EXAMPLE 1

A preferred composition of the invention is made by combining about 40 weight percent tall oil fatty acid (CAS #61790-12-3) with about 26 weight percent fatty alkanolamide (CAS #68155-20-4), with about 19 weight percent methyl ester (CAS #67762-38-3) and about 17 weight percent of a 50/50 mixture of coconut oil and diethanolamine as an emulsifier inside a stirred, vented reactor, thereafter heating by steam to a temperature ranging between about 320 and 350 deg. F. and maintaining such temperature for about six to eight hours, while venting distillates occurring at such temperatures to a condenser or other chilled reactor. The presence of methyl ester is believed to reduce foaming during distillation of the emulsifier. After the reaction pressure is reduced to zero, the composition remaining inside the reactor is sampled and its acid number determined. The AEW of the product is about 2400, and its pH (5% in 3:1 isopropyl alcohol to water) is about 6.9. The product has a specific gravity of about 0.93, a density of 7.78 lbs/gal, a free amine value of about 23.4, and an acid number of about 16.8, compared to an acid number of about 88 for the combined reactants. The product is clear and dark red or red amber in color.

EXAMPLE 2

Another preferred composition of the invention is made by combining about 42 weight percent distilled tall oil (CAS #8002-26-4) with about 26 weight percent fatty alkanolamide (CAS #68155-20-4), about 19 weight percent methyl ester (CAS #74499-22-2), and about 18 weight percent of a corrosion inhibitor 30 that is the reaction product of distilled tall oil with AEP (CAS #71820-35-4 and CAS #68910-93-0) inside a stirred, vented reactor, thereafter heating by steam to a temperature ranging between about 320 and 350° F. and maintaining such temperature for about 6 to 8 hours, while venting distillates occurring at such temperatures to a condenser or other chilled reactor. The presence of methyl ester is believed to reduce foaming during distillation of the emulsifier. After the reaction pressure is reduced to zero, the composition remaining inside the reactor is sampled and its acid number determined. The AEW of the product is about 1657, and its pH (5% in 3:1 isopropyl alcohol to water) is about 6.82. The product has a specific gravity of about 0.98, a density of 8.15 lbs/gal, a free amine value of about 33.9, and an acid number of about 26. The product is viscous, clear and red brown in color. The composition, in its most preferred form, is believed to have the following general molecular structure:

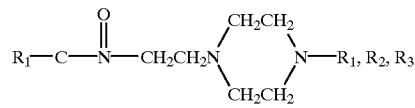

wherein $R_1$ is distilled tall oil or coconut oil; $R_2$ is low rosin tall oil, vegetable oil or distilled tall oil; and $R_3$ is vegetable oil, tall oil or distilled tall oil.

EXAMPLE 3

A composition is made the same as in Example 1 except that distilled tall is oil (CAS #8002-26-4) is substituted for the tall oil fatty acid. The properties of the resultant product are similar to those of the product of Example 1.

Other alterations and modifications of the invention will likewise become apparent to those of ordinary skill in the art upon reading the present disclosure, and it is intended that the scope of the invention disclosed herein be limited only by the broadest interpretation of the appended claims to which the inventor is legally entitled.

What is claimed is:

1. A composition formed by the reaction of, and removal of distillates from, a mixture of:
    a tall oil fatty acid having from 8 to 24 carbon atoms;
    an amide/ester selected from the group consisting of the reaction product of distilled tall oil and an alkanolamine, N, N-bis (hydroxyethyl) tall oil fatty amides, reaction products of rosin with diethanolamine, and reaction products of tall oil fatty acids with diethanolamine;
    a methyl ester of fatty acid; and
    an emulsifier selected from the group consisting of the reaction product of vegetable oil and an alkanolamine, the reaction product of vegetable oil with a polyethylene amine, the reaction product of distilled tall oil with aminoethylpiperazine, the reaction product of distilled tall oil with a polyethylene amine, the reaction product of coconut oil with diethanolamine, and N, N-bis (hydroxyethyl) saturated and unsaturated $C_{8-18}$ amides.

2. The composition of claim 1 wherein the tall oil fatty acid has from 12 to 20 carbon atoms.

3. The composition of claim 1 wherein the amide/ester is the reaction product of distilled tall oil and an alkanolamine.

4. The composition of claim 1 wherein the tall oil fatty acid is distilled tall oil that contains from about 10 to about 50 weight percent rosin acids.

5. The composition of claim 1 wherein each alkanolamine is selected from one of the group consisting of diethanolamine and monoethanolamine.

6. The composition of claim 1 wherein the methyl ester is a methyl ester of tall oil fatty acids.

7. The composition of claim 1 wherein the methyl ester is a methyl ester of $C_{16-18}$ saturated or $C_{18}$ unsaturated fatty acids.

8. The composition of claim 1 wherein the emulsifier is the reaction product of coconut oil with diethanolamine.

9. A well lubricant comprising the composition of claim 8.

10. The composition of claim 1, diluted in a liquid selected from the group consisting of pale oil, white oil, polyalpha olefin, internal olefin, methyl ester, terpene, d-limonene and dipentene.

11. The composition of claim 4 wherein the tall oil fatty acid contains about 2 weight percent rosin.

12. The composition of claim 2 having an acid number less than 35.

13. The composition of claim 12 having an acid number less than 25.

14. The composition of claim 1 wherein the tall oil fatty acid is selected from the group consisting of disproportionated tall oil fatty acids, distilled tall oil; disproportionated tall oil; resin acids and rosin acids; and rosin tall oil.

15. An oil-based drilling mud containing an emulsifying component comprising the composition of claim 1.

16. An oil-based drilling mud containing an emulsifying component comprising the composition of claim 2.

17. An oil-based drilling mud containing an emulsifying component comprising the composition of claim 3.

18. An oil-based drilling mud containing an emulsifying component comprising the composition of claim 4.

19. An oil-based drilling mud containing an emulsifying component comprising the composition of claim 5.

20. An oil-based drilling mud containing an emulsifying component comprising the composition of claim 6.

21. An oil-based drilling mud containing an emulsifying component comprising the composition of claim 7.

22. An oil-based drilling mud containing an emulsifying component comprising the composition of claim 8.

23. An oil-based drilling mud contiaining an emulsifying component comprising the composition of claim 9.

24. An oil-based drilling mud containing an emulsifying component comprising the composition of claim 10.

25. An oil-based drilling mud containing an emulsifying component comprising the composition of claim 11.

26. An oil-based drilling mud containing an emulsifying component comprising the composition of claim 12.

27. An oil-based drilling mud containing an emulsifying component comprising the composition of claim 13.

28. A water-based drilling mud containing an emulsifying component comprising the composition of claim 1.

29. A composition comprising from about 45 to about 90 weight percent of the reaction product of tall oil fatty acid and a fatty alkanolamide, reacted in the presence of from about 5 to about 25 weight percent methyl ester of fatty acids, then further reacted and distilled in the presence of from about 5 to about 30 weight percent of the reaction product of a fatty oil with an alkanolamine.

30. The composition of claim 29 wherein the tall oil fatty acid comprises about 2 weight percent rosin.

31. The composition of claim 29 wherein distilled tall oil is substituted for the tall oil fatty acid.

32. The composition of claim 29 wherein the fatty alkanolamide is the reaction product of distilled tall oil and diethanolamine.

33. The composition of claim 32 wherein the distilled tall oil and diethanolamine are reacted in a ratio of about 3:1 by weight.

34. The composition of claim 29 wherein the fatty oil is obtained selected from the group consisting of coconut oil, coffee oil, soya oil, safflower oil, canola oil, rapeseed oil, flax oil, cotton oil, distilled tall oil, low rosin tall oil, and reclaimed cooking oil.

35. The composition of claim 34 wherein the fatty oil is coconut oil and the alkanolamine is diethanolamine.

36. The composition of claim 29 wherein the methyl ester is a methyl ester of $C_{16-18}$ saturated or $C_{18}$ unsaturated fatty acids.

37. The composition of claim 29 wherein the methyl ester is a methyl ester of tall oil fatty acids.

38. A composition comprising a reaction product having the following structural formula:

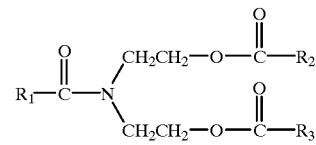

wherein $R_1$ is a substituent form of an oil selected from the group consisting of distilled tall oil and coconut oil; $R_2$ is a substituent form of an oil selected from the group consisting of low rosin tall oil, vegetable oil and distilled tall oil; and $R_3$ is a substituent form of an oil selected from the group consisting of vegetable oil, vegetable extract, tall oil and distilled tall oil.

39. The composition of claim 38 wherein the vegetable oil is selected from the group consisting of oil from coconut, coffee, soya, safflower, canola, rapeseed, flax, cotton and reclaimed cooking oil.

40. The composition of claim 38 wherein the vegetable extract is selected from the group consisting of extracts from coconut, coffee, soya, safflower, canola, rapeseed, flax, and cotton.

41. A composition comprising the reaction product of:
from about 60 to about 90 weight percent of a first reaction product of distilled tall oil with a fatty alkanolamide, the distilled tall oil containing from about 10 to 50 weight percent rosin acids; with
from about 10 to about 20 weight percent of a second reaction product of distilled tall oil and aminoethylpiperazine;
said reaction of said first and second reaction products taking place in a stirred, vented reactor as the temperature inside the reactor is gradually increased to from about 320 to about 350° F., with continuous distillation, until such time as the reaction is substantially complete.

42. The composition of claim 41 wherein the reaction product is produced in the presence of from about 5 to 25 weight percent methyl ester of fatty acids having from 16 to 18 carbon atoms.

43. The composition of claim 41 wherein the fatty alkanolamide is the reaction product of distilled tall oil and diethanolamine.

44. The composition of claim 41 comprising from about 30 to about 60 weight percent distilled tall oil.

45. The composition of claim 41 comprising from about 30 to about 60 weight percent fatty alkanolamide.

46. The composition of claim 43 wherein the ratio of distilled tall oil to diethylanolamine is about 3:1 by weight.

47. The composition of claim 41 wherein the distilled tall oil contains about 25 weight percent rosin.

48. The composition of claim 47 wherein the methyl ester contains about 25 weight percent rosin.

49. A method for making a lubricant composition comprising the steps of:
combining and mixing inside a stirred reactor vessel in fluid communication with a condenser reactants comprising from about 55 to about 90 weight percent of a mixture of fatty acids and amide/ester wherein the ratio of fatty acid to amide/ester ranges from about 2:1 to about 3:2, from about 5 to about 30 weight percent of an emulsifier and up to about 25 weight percent of a methyl ester of fatty acid;
gradually heating the reactants to a temperature above 300° F. while stirring;
maintaining the temperature of the reactants above about 300° F. with stirring for a period of from about 6 to about 12 hours while removing distillate from the reactants; and thereafter
recovering a reaction product remaining inside the reactor.

50. The method of claim 49 wherein the temperature of the reactants is maintained between about 320° F. and about 350° F.

51. The method of claim 49 wherein the temperature of the reactants is maintained above about 300° F. for a period of from about 6 to about 8 hours.

52. The method of claim 49 wherein the reaction product weighs from two to four percent less than the reactants.

53. The method of claim 49 wherein the reaction product has an acid number lower than 35.

54. The method of claim 53 wherein the acid mumber is lower than 25.

55. The method of claim 49 wherein the reaction product has a pH ranging between 6 and 8.

56. The method of claim 55 wherein the pH of the reaction product ranges from about 6 to about 7.5.

57. The method of claim 49 wherein the reaction product has an amine equivalent weight greater than 1000.

58. A composition made by combining a tall oil fatty acid with a fatty alkanolamide, a methyl ester and a mixture of coconut oil and diethanolamine inside a stirred, vented reactor, thereafter heating to a temperature ranging between about 320° and 350° F. and maintaining such temperature for about 6 to 8 hours, while venting distillates occurring at such temperatures.

59. The composition of claim 58, made with about 40 weight percent tall oil fatty acid, about 26 weight percent fatty alkanolamide, about 19 weight percent methyl ester and about 17 weight percent of a 50/50 mixture of coconut oil and diethanolamine.

60. A composition made by combining distilled tall oil with a fatty alkanolamide, a methyl ester and a corrosion inhibitor that is the reaction product of distilled tall oil with aminoethylpiperazine inside a stirred, vented reactor, thereafter heating to a temperature ranging between about 320° and 350° F. and maintaining such temperature for about 6 to 8 hours, while venting distillates occurring at such temperatures.

61. The composition of claim 60, made with about 42 weight percent distilled tall oil, about 26 weight percent fatty alkanolamide, about 19 weight percent methyl ester and about 18 weight percent of a corrosion inhibitor that is the reaction product of distilled tall oil with aminoethylpiperazine.

62. A composition made by combining distilled tall oil with a fatty alkanolamide, a methyl ester and a 50/50 mixture of coconut oil and diethanolamine inside a stirred, vented reactor, thereafter heating to a temperature ranging between about 320° and 350° F. and maintaining such temperature for about 6 to 8 hours, while venting distillates occurring at such temperatures.

63. A composition comprising a reaction product having the following structural formula:

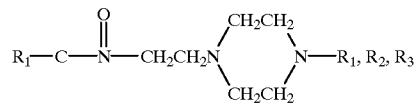

wherein $R_1$ is a substituent form of distilled tall oil or coconut oil; $R_2$ is a substituent form of low rosin tall oil, vegetable oil or distilled tall oil; $R_3$ is a substituent form of vegetable oil, tall oil or distilled tall oil; and wherein $R_1$, $R_2$, $R_3$ designates any one of $R_1$ or $R_2$ or $R_3$.

* * * * *

UNITED STATES PATENT AND TRADEMARK OFFICE
CERTIFICATE OF CORRECTION

PATENT NO. : 6,489,272 B2
DATED : December 3, 2002
INVENTOR(S) : Larry W. Gatlin It is certified that error appears in the above-identified patent and that said Letters Patent is hereby corrected as shown below:

Column 1,
Line 46, replace "either" with -- ether --.

Column 4,
Between lines 62 and 63, insert the following paragraph:

```
    According to a particularly preferred method of the invention,
the fatty acid and amide/ester components are combined and mixed
in a stirred reactor vessel equipped with steam coils and vented
to another chilled vessel that serves as a condenser during dis-
tillation. Using steam heat, such as heat provided from 135 pound
steam, for example, the temperature of the reactants is gradually
increased to about 180° F.  At this point the total weight of the
reactants is desirably determined, such  as by weighting the reactor
plus reactants and netting out the weight of the empty reactor.  As
the temperature of the reactants reaches about 212° F, water begins
to distill off.  As the temperature reaches about 280° F, the
reaction rate increases substantially.  The time required for the
reactants to reach 280° will vary according to the particular types
and amounts of reactants, amount of water in the reactants, heating
rate, ambient conditions, and heat loss from the reactor, but times
ranging from about 2 to about 6 hours are typical.
```

Signed and Sealed this

Twentieth Day of May, 2003

JAMES E. ROGAN
*Director of the United States Patent and Trademark Office*